Feb. 13, 1934.   E. R. EVANS   1,947,193
ELECTRICAL POWER DISTRIBUTION SYSTEM
Filed Feb. 25, 1931   3 Sheets-Sheet 2
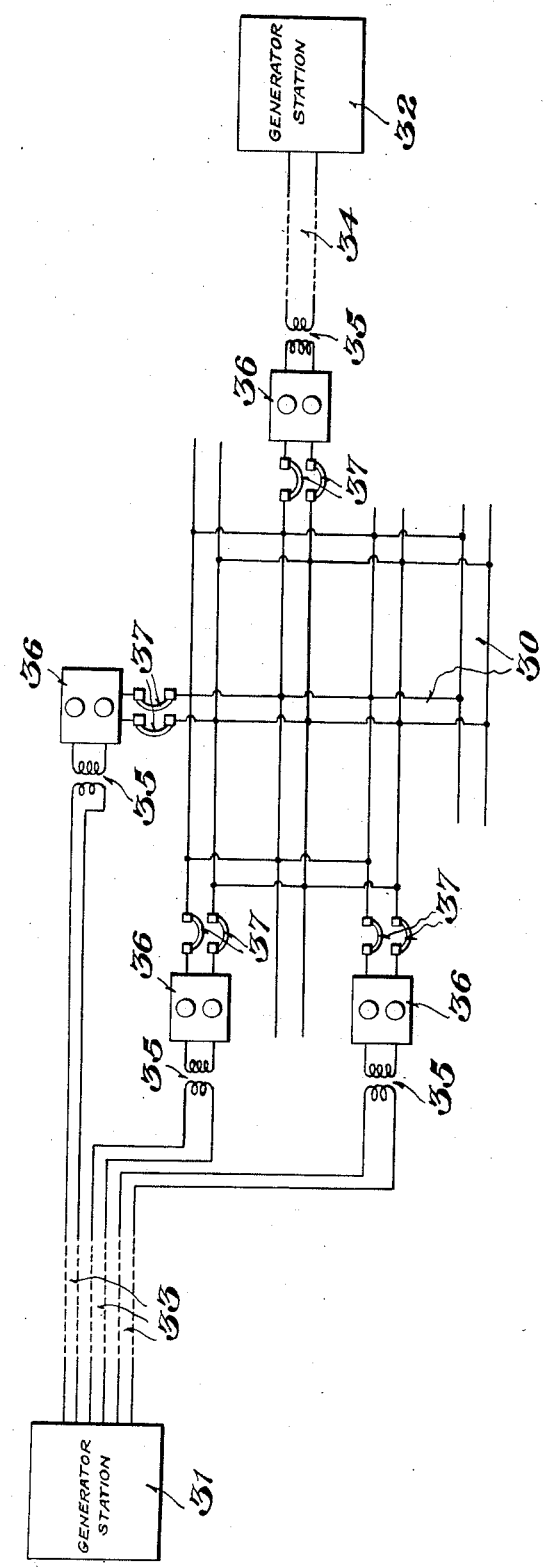
Inventor
Earl R. Evans Feb. 13, 1934.  E. R. EVANS  1,947,193
ELECTRICAL POWER DISTRIBUTION SYSTEM
Filed Feb. 25, 1931   3 Sheets-Sheet 3
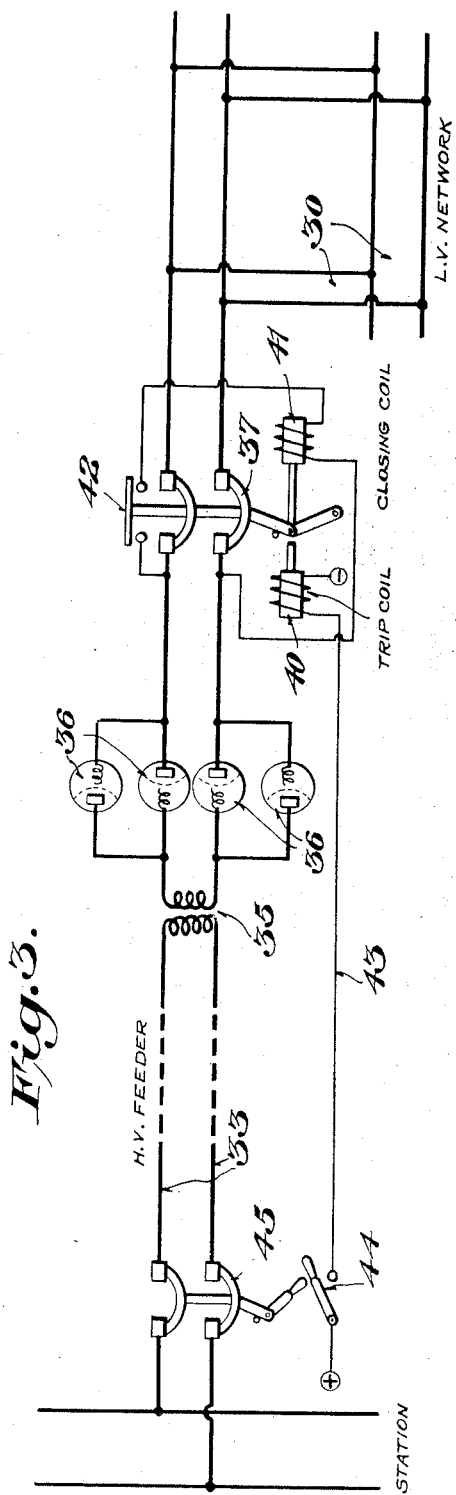
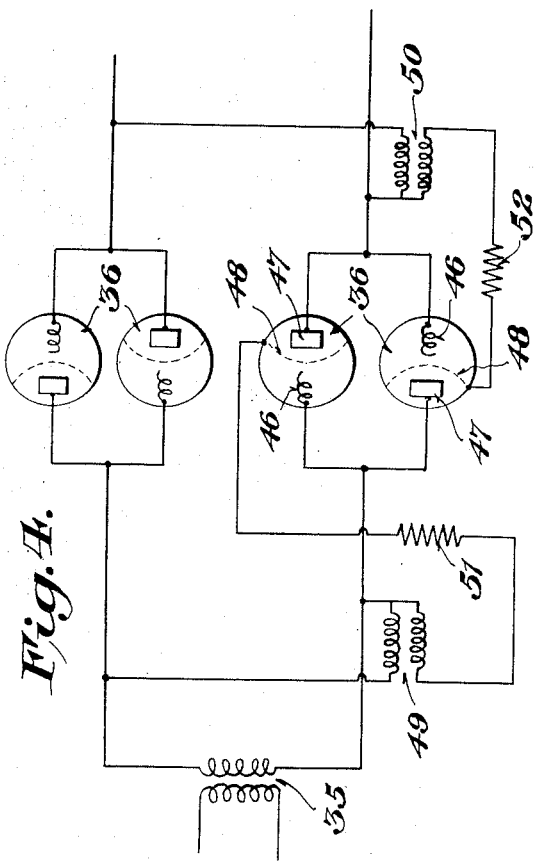
Inventor
Earl R. Evans Patented Feb. 13, 1934

1,947,193

UNITED STATES PATENT OFFICE 1,947,193

ELECTRICAL POWER DISTRIBUTION SYSTEM

Earl R. Evans, Washington, D. C.

Application February 25, 1931. Serial No. 518,277

15 Claims. (Cl. 175—294)

My invention relates to electrical power distribution systems, and particularly to parallel-feeder distribution systems embodying electric space-discharge devices responsive to reversals of power in a circuit or operative to control or regulate a circuit upon a reversal of power in that circuit.

One object of my invention is to provide an improved power distribution system embodying a space-discharge device of controllable impedance, such as a controlled vapor or gaseous discharge valve provided with a control element operating with an arc discharge in contra-distinction to space-discharge devices operating with substantially pure electronic discharge. Such a value or tube, one embodiment of which is described in the patent to Langmuir, No. 1,289,823, dated December 31, 1918, has a large current-carrying capacity and a low internal voltage-drop so that it is adapted to operate with high efficiency on ordinary low-voltage power circuits.

When an alternating potential is applied to the cathode and anode of a controlled gaseous discharge valve or device, the average value of the space current through the device depends upon the magnitude, and, in some instances, the phase relation of the potential on the control electrode or grid. The detailed construction and theory of operation of such a valve are set forth in the above mentioned patent. Accordingly, this specific valve or tube is referred to herein, although the detailed construction of the arc-discharge device may be modified, as the object of my invention, in general terms, is to provide a system embodying a device of this general character which is responsive to or rendered operative upon the reversal of the flow of power in a circuit to control or regulate said circuit or an associated circuit.

An important application of my invention is in connection with low-voltage metropolitan networks to replace or simplify the sensitive relays and large circuit breakers heretofore used in systems of this character.

My invention also has among its objects the provision of protective arrangements in which relay systems may be greatly simplified or entirely eliminated; in which faults on the low-voltage feeders may be allowed to burn themselves out without interruption of service; and network systems in which the flow of current to faults on the high-voltage feeders will be controlled or limited.

A further object of the invention is to provide a system embodying parallel feeders wherein reverse-power flow under fault conditions will be positively prevented.

Other objects and advantages of my invention will appear from the following description of the embodiments thereof shown in the accompanying drawings, wherein:—

Fig. 2 is a diagrammatic view showing the invention applied to a low-voltage network distribution system;

Fig. 3 is a detailed view of one of the feeders shown in Fig. 2; and

Fig. 4 is a diagrammatic view, illustrating an alternative manner of controlling the space-discharge devices.

Figure 1:
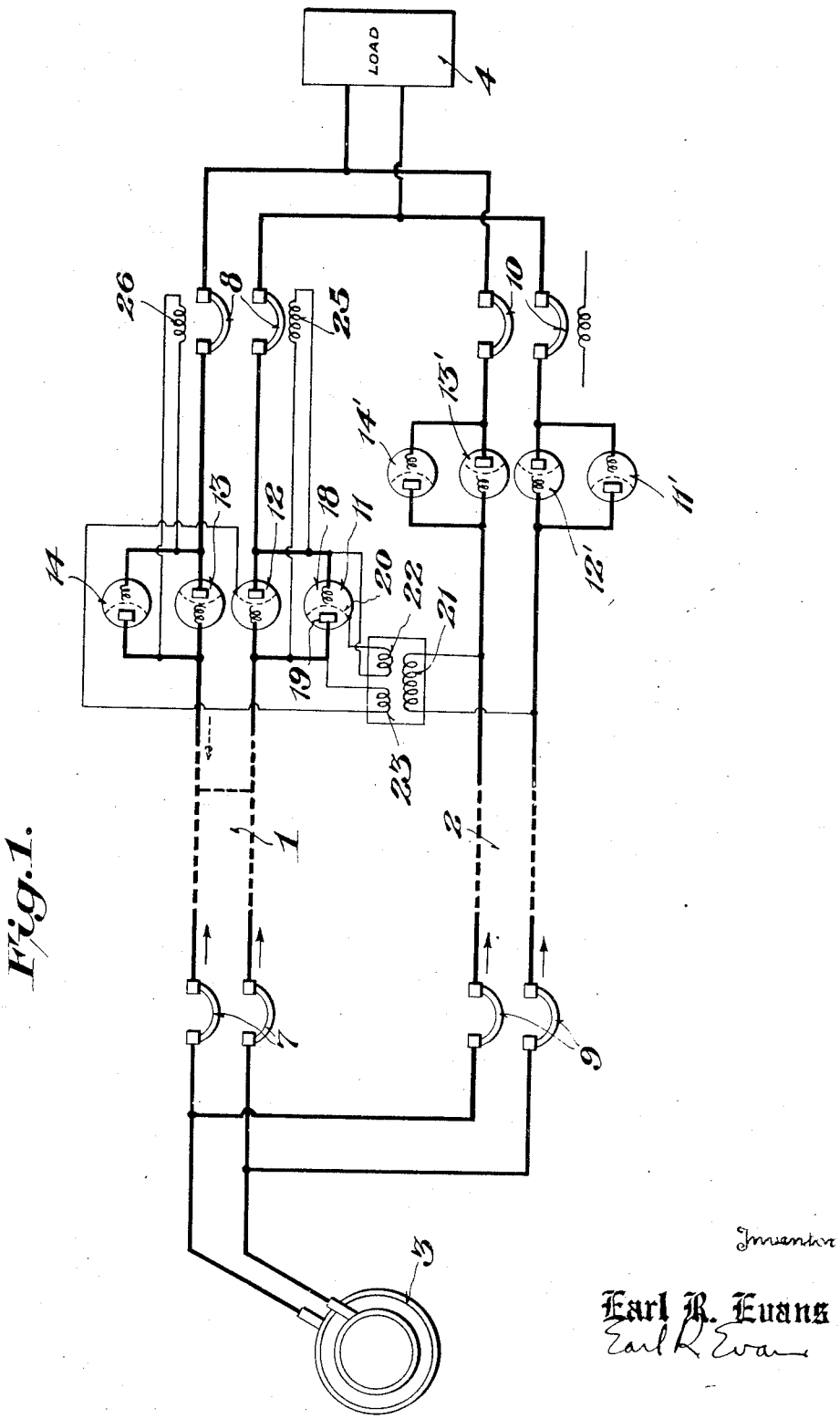
Fig. 1 is a diagrammatic view of one form of parallel-feeder distribution system embodying my invention.

Fig. 1 of the drawings illustrates one application of a power-directional system embodying electric space discharge valves or tubes to a parallel-feeder distribution system. Referring to this figure, the reference characters 1 and 2 designate parallel feeders supplying alternating current from a source 3 to a load 4. The source 3 may be of any suitable form, either single-phase or polyphase but is here shown as an alternating-current generator, and similarly the load 4 may be of almost any character.

Interposed in the feeder 1 between the source and load are two circuit breakers, 7 and 8, the breakers 7 and 8 being located at the opposite ends of the feeder. Included in the feeder 1 between the breakers 7 and 8, and preferably located adjacent the circuit breaker 8 are a plurality of space-discharge devices or tubes 11, 12, 13, 14, of a controlled gaseous discharge type each having three electrodes. Tube 11, for example, has a cathode 18, an anode 19, and a grid or control electrode 20. The other tubes are of similar construction and are controlled in similar manner so that a description of the method of controlling tube 11 will suffice for all.

These tubes are connected, two in each line so as normally to permit current to flow in both directions, and as here shown, the control electrodes of tubes 11 and 12 are supplied with potential from a transformer, the primary 21 of which is connected across the feeder 2 and is energized therefrom. This transformer has two secondaries 22 and 23, the secondary 22 supplying potential to the grid 20 of tube 11, and the secondary 23 supplying potential to the grid of tube 12. The grids of tubes 13 and 14 may be energized in similar manner, from the same or a separate transformer, and since the method of making these connections is obvious, the connections have been omitted in order to simplify the illustration.

Operatively associated with the circuit breaker 8 are two trip coils 25 and 26, either of which is operative when energized to open the circuit breaker. Coil 25 is connected across tubes 11 and 12 and is of sufficiently high resistance to avoid short-circuiting these tubes, but may be designed to trip the circuit breaker 8 whenever the voltage across tubes 11 and 12 reaches a predetermined value. The coil 26 is similar and is connected across tubes 13 and 14 in like manner.

The feeder 2 likewise contains a circuit breaker 9 at the main station, a circuit breaker 10 at the substation and controlled gaseous discharge valves or tubes 11', 12', 13' and 14' adjacent the latter. The grids of these tubes may be supplied with potential by transformers connected to feeder 1 or to any other associated circuit synchronized therewith, and the trip coil of circuit breaker 10 may be connected across the tubes in the same manner as coils 25 and 26 are connected across tubes 11, 12, 13 and 14.

The operation of the power distribution system shown in Fig. 1 is as follows: Under normal conditions with all of the circuit breakers closed, power flows from the generator 3 over the parallel feeders 1 and 2 to the load, or in the direction indicated by the solid arrows. At such times the tubes 11, 12, 13 and 14 offer minimum impedance to flow of current in feeder 1 and the same is true of the tubes 11', 12', 13', 14' in feeder 2 irrespective of the load. If, however, a fault occurs in feeder 1, as indicated in dotted lines at 5, the direction of power flow through tubes 11, 12, 13 and 14 tends to reverse so that power is supplied from feeder 2 through the circuit breaker 8 and back to feeder 1, or as indicated by the dotted arrow. The phase relation between the voltage and current in feeder 1 adjacent the circuit breaker 8 will then not be the same as that in feeder 2 and the potentials applied to the grids of tubes 11, 12, 13 and 14 will have such phase relation as to increase the average impedance of these tubes and thereby limit the fault current supplied by the parallel feeder 2. In other words, assuming direct power flow in feeder 1 with the current and voltage substantially in phase, then the two valves in each conductor of the feeder are alternately conductive when the voltages of their anodes are positive with respect to the voltages of their cathodes since the control electrodes or grids are then positive. However, assuming a tendency to reverse power flow in the feeder 1, due to a fault as at 5, then when the voltages of the anodes are positive with respect to the voltages of the cathodes, the grids whose potentials are derived from the feeder 2 are negative and the valves are nonconductive. If the power factor of the circuit is other than plus or minus one, then the tubes instead of being alternately conductive over one-half cycle and both non-conductive over a whole cycle are alternately conductive over part of a half cycle and both non-conductive over part of the whole cycle. Consequently, the average impedance of the valves is increased upon a tendency to power reversal because the phase of the anode-cathode voltage of each valve is shifted approximately 180° while the phase of the grid voltage remains substantially unchanged.

The tubes 11', 12', 13' and 14', being connected in feeder 2 in a similar manner so as to be controlled by the potential of the feeder 1, will be effective in a similar manner if a fault occurs in feeder 2. The occurrence of a fault in feeder 1, as described, does not substantially affect the tubes 11', 12', 13', 14' because the voltage on the short-circuited feeder is very low. In similar manner a fault in feeder 2 will not substantially affect the tubes in feeder 1. The disconnection of the faulty feeder from the generator is accomplished in the usual manner, as by means of overload trip coils upon the circuit breakers 7 and 9.

Under the above-described conditions, enough current traverses the trip coils 25 and 26 to trip the breaker 8, although the resistances of these coils are so high that under normal conditions they do not short-circuit the tubes, which arc over at about 12–15 volts. The breaker 10 would be controlled in similar manner, if failure in feeder 2 should cause a dangerously heavy fault current to flow in this feeder. Thus the faulty feeder is disconnected at both ends from the system.

Systems embodying my invention find application not only in parallel-feeder systems generally, but are especially applicable to systems of the so-called low-voltage network distribution type. Systems of this character are commonly employed for supplying heavy loads in metropolitan areas where continuity of service is of paramount importance and, consequently, it has been found practicable to allow network faults to burn themselves out rather than to disconnect the high-voltage feeders upon the occurrence of faults in the low-voltage areas. If such faults in the low-voltage network were allowed to trip the breakers of the high-voltage feeders, a progressive interruption of these feeders would take place with consequent disruption of service. Short-circuits on a high-voltage feeder or in a transformer between a feeder and the network must be cleared by disconnecting the feeder or transformer from the system; hence any practical system must allow low-voltage or network faults to burn themselves out, and yet be so designed as to disconnect any high-voltage feeder or transformer or limit the current therein to a safe value when a fault occurs in such feeder or transformer.

An embodiment of a system of this type is shown in Figs. 2 and 3, where the reference character 30 designates generally a low-voltage metropolitan network to which energy is supplied from a plurality of separated alternating-current generating stations or substations. Only two of these stations, designated 31 and 32, are shown, but obviously the system may include any number of such stations. High-voltage feeders 33 and 34 supply current from these stations to the network 30 through transformers 35, arc-discharge valve groups 36 and circuit breakers 37.

In practice, the circuit breakers 37 and transformers 35 for each feeder are usually located in a manhole in the street where space is limited and ventilation is poor. In the systems of the prior art these circuit breakers have been controlled by complicated relay systems designed to trip the breaker when a reversal in direction of power flow occurred in its circuit as a result of a fault in the feeder or transformer, but not when even a severe fault or overload occurred in the associated low-voltage network. In some instances these systems have included mechanism for automatically reclosing the circuit breakers when the voltages on the terminals of the breakers assume values such that power will flow in the proper direction when the breakers are reclosed. In all cases these relays must be relatively complicated and delicate to respond to exacting conditions and are very liable to derangement and are expensive to install and maintain. Furthermore, the circuit breakers had to be designed to handle heavy currents although ordinarily used where space is at a premium and ventilation poor.

The present system is designed greatly to simplify the relay system or to eliminate it entirely, and make it possible to reduce the size and capacity of the circuit breakers. Such a result is obtained by interposing arc-discharge devices, such as controlled gaseous discharge valve groups 36, between the transformers 35 and breakers 37. The tubes in these groups are so arranged and controlled as to present impedance to a reversal of power flow such as would result from a fault in a feeder 33 or in a transformer 35, but to present practically no impedance to current flow from any feeder 33 to the network 30. The circuit breakers 37 may be controlled by reverse-energy relays in the usual manner with the advantage over prior systems that the necessary capacity of the circuit breakers is substantially reduced by the current-limiting function of the tubes 36.

However, as shown in Fig. 3, I prefer to eliminate these relays entirely and to control the circuit breakers 37 directly from a generating station over a pilot-wire circuit designed for this purpose.

Referring now to Fig. 3, a single high-voltage feeder 33, including a circuit breaker 45 at the main station, is shown as supplying power to a branch of a low-voltage network 30 through a transformer 35, an arc-discharge valve group 36 and a circuit breaker 37. The arc-discharge valve group 36 may be arranged as in Fig. 1 to be responsive to a reversal in the direction of the flow of power therethrough and to control or limit such reversal, which might be caused by a fault on the feeder 33 or in the transformer 35.

The circuit breaker 37 has associated with it a trip coil 40 controlled over a pilot-wire circuit 43 by a switch 44 in the main station. Also associated with the circuit breaker 37 is a closing coil 41 controlled over contacts 42 on the breaker and so arranged that the coil is energized to close the breaker whenever the same is open and transformer 35 is energized. When faults occur in the low-voltage network 30, such faults are permitted to burn themselves out. If a fault should occur on the high-voltage feeder 33 or in the transformer 35, the tubes 36 would limit the current flow from the network while the tripping of the automatic overload breaker 45 or other usual automatic or supervisory apparatus would call attention to the abnormal condition and the station attendant could close switch 44 thus opening the circuit breaker 37 to isolate the faulty feeder or transformer. After necessary repairs were made on the circuit, the breaker 45 would again be closed and breaker 37 would automatically be closed with it.

It will be apparent from the foregoing description that the present invention not only eliminates complicated and delicate relays, but it provides an apparatus which is dependable and positive in operation. It further offers the advantage, since the reversal of current flow is limited by the arc-discharge valve groups, that smaller circuit breakers may be employed.

In Fig. 1 I have shown an arrangement whereIn the arc-discharge valves in one feeder are controlled by potentials derived from a parallel feeder. My invention is not, however, limited to this specific arrangement in connection with network distribution systems and the like, it being equally satisfactory under some conditions to control the arc-discharge valves in one feeder by potentials derived from that same feeder. Such an arrangement is shown in Fig. 4, wherein a transformer 35 is indicated as supplying current to a distribution circuit comprising arc-discharge valves 36 oppositely arranged to permit an alternating current to flow in either direction in each conductor of the circuit under normal conditions. The tubes 36 each comprise a cathode 46, anode 47 and control electrode 48. The potentials of the control electrodes 48 are controlled by potential transformers 49 and 50, respectively, having their primaries connected across the distribution circuit. Obviously these transformers might be connected to another circuit, preferably one having a voltage in phase with that of the circuit shown. Resistors 51 and 52 may be provided to limit the current traversing the control electrode circuits.

In this illustration I have omitted the control electrode connections to the tubes in one conductor of the circuit, but it will be obvious that they may be connected in the same manner as those in the other conductor or in any equivalent manner.

The operation of the system shown in Fig. 4 is as follows: The arc-discharge devices 36 normally present substantially no impedance to the current supplied to the network from the transformer 35. Upon a reversal of the flow of power in the circuit, or upon other predetermined change in the phase relation between current and voltage, the phase relations of the alternating potentials upon the control electrodes 48 shift in such a manner as to increase the impedance of the tubes 36 and thereby control or limit the current flowing therethrough.

It will be obvious that various changes and modifications may be made in the system disclosed without departing from the spirit and scope of the invention as defined in the following claims.

What I claim is:—

1. A power distribution system comprising a plurality of parallel-connected alternating-current feeder circuits; space-discharge means in one feeder for preventing reverse-energy flow in said feeder; and means connected to another feeder for controlling the space-discharge means in said one feeder.

2. A power distribution system comprising a plurality of parallel-connected alternating-current feeder circuits; means comprising a plurality of space-discharge devices of the arc-discharge type having their anode-cathode circuits connected in one of said feeder circuits; and means energized by another of said feeder circuits for controlling said first-mentioned means.

3. A power distribution system comprising a distribution network; a source of alternating current; a plurality of feeder circuits connected in parallel between said source and said network; means comprising a plurality of space discharge devices interposed between each feeder and the network for controlling the system and means for controlling said first-mentioned means to prevent the flow of power from one feeder to another feeder.

4. A power distribution system comprising a distribution network; a plurality of alternating-current feeder circuits connected in parallel and supplying current to said network; and means responsive to faults on said feeder circuits for preventing power flow from the network to a faulty feeder, comprising a plurality of space-discharge devices of the arc-discharge type connected between each feeder circuit and the network.

5. A power distribution system comprising a low-voltage distribution network; a plurality of high-voltage feeder circuits connected in parallel and supplying current to the network; and means comprising a plurality of arc-discharge tubes connected between each feeder circuit and the network for controlling the current flow therebetween in response to changes in direction of power flow between said feeder circuits and said network.

6. A power distribution system comprising a low-voltage distribution network; a plurality of high-voltage feeder circuits connected in parallel and supplying current to said network; and means for preventing power flow from one feeder to another through said network including a plurality of arc-discharge tubes in each feeder.

7. A power distribution system comprising an alternating-current source; a low-voltage distribution network; a plurality of high-voltage feeder circuits connected in parallel between said source and said network; a plurality of arc-discharge tubes in one feeder; and means connected to another feeder for varying the impedance of said tubes for controlling the power flow in said one feeder.

8. A power distribution system comprising a source of alternating current; a load circuit; a plurality of parallel feeder circuits between said source and said load circuit; a transformer in each feeder circuit; space-discharge means in each feeder responsive to faults in the feeder tending to cause power flow from the load circuit toward the feeder and means for decreasing the conductivity of said space discharge means on the occurrence of such faults.

9. A power distribution system comprising a plurality of parallel connected alternating current circuits, space discharge means in series relation with one of said circuits for preventing reverse energy flow in the circuit, and means connected to be energized from another of said circuits for controlling the space discharge means in said one circuit.

10. A power distribution system comprising a plurality of parallel connected alternating current circuits, space discharge means in one circuit for preventing reverse energy flow in said circuit, and means connected to be energized in accordance with a voltage of a part of the system external to said one circuit for controlling the space discharge means in said one circuit.

11. A power distribution system including a plurality of parallel connected alternating current circuits and means for preventing a flow of power from one circuit to another including a plurality of space discharge valves connected in series relation with said circuits and means connected to be energized from one of said circuits for controlling the valves associated with another of the circuits.

12. A power distribution system comprising a plurality of parallel connected alternating current circuits, space discharge means in one circuit for preventing reverse energy flow in said circuit and means including a transformer connected to be energized from another of said circuits for controlling the space discharge means in said one circuit.

13. A power distribution system comprising a source of alternating current, a low voltage network, a plurality of high voltage feeders supplied by said source, a step-down transformer between each feeder and the network, space discharge means connected in each feeder between the transformer and the network responsive to faults in the feeder and the associated transformer tending to cause power flow from the network toward the feeder and means for decreasing the conductivity of said space discharge means on the occurrence of such faults.

14. In combination, a power distribution circuit, an arc discharge valve, a switch in series with said circuit and means for controlling the operation of said switch connected to be energized in response to a change from the normal potential drop in said valve.

15. In combination, a power distribution circuit, an arc-discharge valve in circuit therewith, a switch in said circuit and means for effecting the opening of said switch connected to respond to a change from a predetermined potential drop in said valve.

EARL R. EVANS.